United States Patent [19]

Fujiwara

[11] Patent Number: 4,513,416
[45] Date of Patent: Apr. 23, 1985

[54] SYSTEM FOR ADJUSTING A TIME AXIS BY USING A CONTROL AND AN ADJUSTMENT TIME SLOT IN A SATELLITE STATION OF A TDMA NETWORK

[75] Inventor: Ryuhei Fujiwara, Tokyo, Japan

[73] Assignee: Nippon Electric Co., Ltd., Tokyo, Japan

[21] Appl. No.: 472,677

[22] Filed: Mar. 7, 1983

[30] Foreign Application Priority Data

Mar. 10, 1982 [JP] Japan ................................. 57-36654

[51] Int. Cl.³ .............................................. H04J 3/06
[52] U.S. Cl. ....................................... 370/100; 370/104
[58] Field of Search ........................... 370/104, 100, 95

[56] References Cited

U.S. PATENT DOCUMENTS

| | | | |
|---|---|---|---|
| 4,010,420 | 3/1977 | Reiner et al. | 370/104 |
| 4,129,755 | 12/1978 | Murakami | 370/104 |
| 4,168,398 | 10/1979 | Matsuo et al. | 370/104 |
| 4,256,925 | 3/1981 | Goode | 370/104 |
| 4,259,741 | 3/1981 | Kawai | 370/75 |
| 4,322,845 | 3/1982 | Fennel, Jr. et al. | 370/104 |
| 4,330,857 | 5/1982 | Alvarez et al. | 370/104 |
| 4,330,859 | 5/1982 | Takada | 370/113 |

Primary Examiner—Douglas W. Olms
Assistant Examiner—Kenneth I. Rokoff
Attorney, Agent, or Firm—Laff, Whitesel, Conte & Saret

[57] ABSTRACT

In a TDMA network wherein a central station sends signals towards satellite stations in downward frames (A), each comprising a control time slot (Td0) and speech time slots (Td1 to TdM), and receives signals from one to M satellite stations in upward frames (C) of a like format, the central station checks the number of idle time slots in each of the downward and upward frames. Only when the number exceeds a preselected number, one of the idle time slots is selected as an adjustment time slot. The ordinary number given to the adjustment time slot is transmitted in a number field (Nf) of the downward control time slot. Each satellite station generates a time axis indicative of local time slots (D) with a delay relative to the thereby received downward time slots (B). On adjusting the time axis in a selected satellite station, the station sends a short burst ($t_s$) in the local time slot indicated by the received number field. In compliance with an error with which the burst reaches the central station, the delay is rendered equal to a prescribed frame delay ($t_e$) minus twice a propagation delay ($t_d$) between that satellite station and the central station.

4 Claims, 9 Drawing Figures

SYSTEM FOR ADJUSTING A TIME AXIS BY USING A CONTROL AND AN ADJUSTMENT TIME SLOT IN A SATELLITE STATION OF A TDMA NETWORK

BACKGROUND OF THE INVENTION

This invention relates to a time axis adjusting system for use in a radio communication network for carrying out time division multiple access (TDMA) communication.

As described in U.S. Pat. No. 4,330,859 issued to Masami Takada and assigned to the present assignee, a multi-directional time division multiplex communication network comprises a central or base station and a plurality of substations around the central station. In a large-scale network, a plurality or repeater stations are situated around the central station with a plurality of substations scattered around each repeater station. The substations and/or the repeater stations will be called satellite stations in the following.

As will later be described more in detail with reference to one of nine figures of the accompanying drawing, a downward stream of transmission signals is sent from the central station towards the satellite stations in frames. Each frame comprises a predetermined number of time slots, which may be identified by consecutive numbers without loss of generality.

On carrying out communication with a selected one of the satellite stations, the central station assigns or allots one of the time slots in each frame to the selected station as a downward communication channel. The selected station may either be a call originating station or a satellite station to which a call originates at the central station. It is of course necessary on assigning the time slot that at least one of the time slots be idle in a frame, namely, not busy. The central station sends burst signals through the downward communication channel to the satellite stations as the transmission signals.

Clock synchronism is established in the satellite station by regenerating a sequence of clock pulses from the transmission signals. Furthermore, a time axis specific to the satellite station is generated by detecting a frame synchronization code included in the downward stream preferably in each frame.

The central station receives burst signals as an upward stream of transmission signals from those of the satellite stations which are communicating with the central station. Like for the transmission signals of the downward stream, time slots are assigned to the communicating satellite stations in each frame as upward communication channels. The time axis specific to each communicating satellite station must be in correct synchronism with the upward stream received at the central station.

According to the prior art, the time axis is adjusted in each satellite station so as to achieve the correct synchronism either by the use of a certain one of the communication channels or an additional channel. The prior art time axis adjusting methods are defective in the following respects.

When the communication channel is used, the time axis adjustment is carried out at the time of installation of the central and the satellite stations. The time axis must furthermore be adjusted at regular intervals with the communication interrupted. In other words, the time axis adjustment has a higher priority than the communication. Despite the higher priority, the adjustment must be carried out in short intervals of time. This is specifically objectionable when a new satellite station is added to the network. Moreover, the communication temporarily becomes infeasible due to the time axis adjustment. The network is therefore unreliable. In addition, the time slots are not effectively used in communication. This degrades the service.

When the additional channel is used, an additional radio frequency must be allotted to the network in question. The frequency bands are not effectively used. Furthermore, each satellite station must include an additional receiver. The network is therefore rendered expensive.

SUMMARY OF THE INVENTION

It is therefore an object of the present invention to provide a time axis adjusting system for use in a time division multiple access communication network, which adjusting system is reliable and yet economical.

It is another object of this invention to provide a time axis adjusting system of the type described, in which communication is given a higher priority than adjustment of the time axis.

It is still another object of this invention to provide a time axis adjusting system of the type described, by which it is possible to adjust the time axis during a total period of an appreciable length of time.

It is yet another object of this invention to provide a time axis adjusting system of the type described, which enables effective use of time slots.

It is a further object of this invention to provide a time axis adjusting system of the type described, for which it is unnecessary to allot an additional radio frequency.

It is a still further object of this invention to provide a time axis adjusting system of the type described, for which it is unnecessary that each satellite station of the time division multiple access communication network includes an additional receiver for use in solely adjusting the time axis.

A time axis adjusting system according to this invention, is for use in a radio communication network in which time division multiple access communication is carried out between a central station and a plurality of satellite stations by the use of signals sent in downward frames and received in upward frames at the central station. Each of the downward and the upward frames comprises a predetermined number of consecutively numbered speech time slots of a common time slot length. Each downward frame further comprises a control time slot including a frame synchronization code as a part of the signals. The satellite stations comprise time axis generating means for generating time axes specific thereto. The time axes are for defining local time slots in which signals are sent to be received at the central station in the upward frames from those of the satellite stations which are carrying out the time division multiple access communication.

According to this invention, the central station comprises: first central station means for checking whether or not more than a preselected number of the speech time slots are idle time slots in each of the downward and the upward frames and for assigning one of the idle time slots in one each of the downward and the upward frames to one of the satellite stations as an adjustment time slot for use in adjusting the time axis specific to the above-mentioned one of the satellite stations; and second central station means coupled to the first central station means for transmitting a number code in the control time slot wherein the number code is representative of the number given to the adjustment time slot.

DESCRIPTION OF THE PREFERRED EMBODIMENTS

Figure 1:
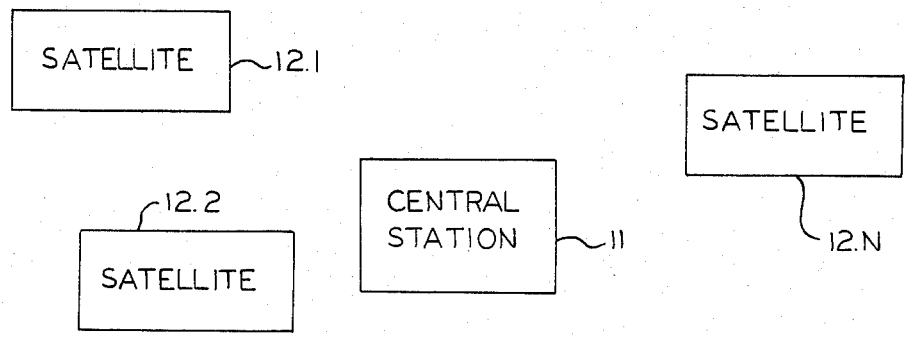
FIG. 1 shows a radio communication network, in which time division multiple access communication is carried out and to which the instant invention is applicable.
Figure 2:
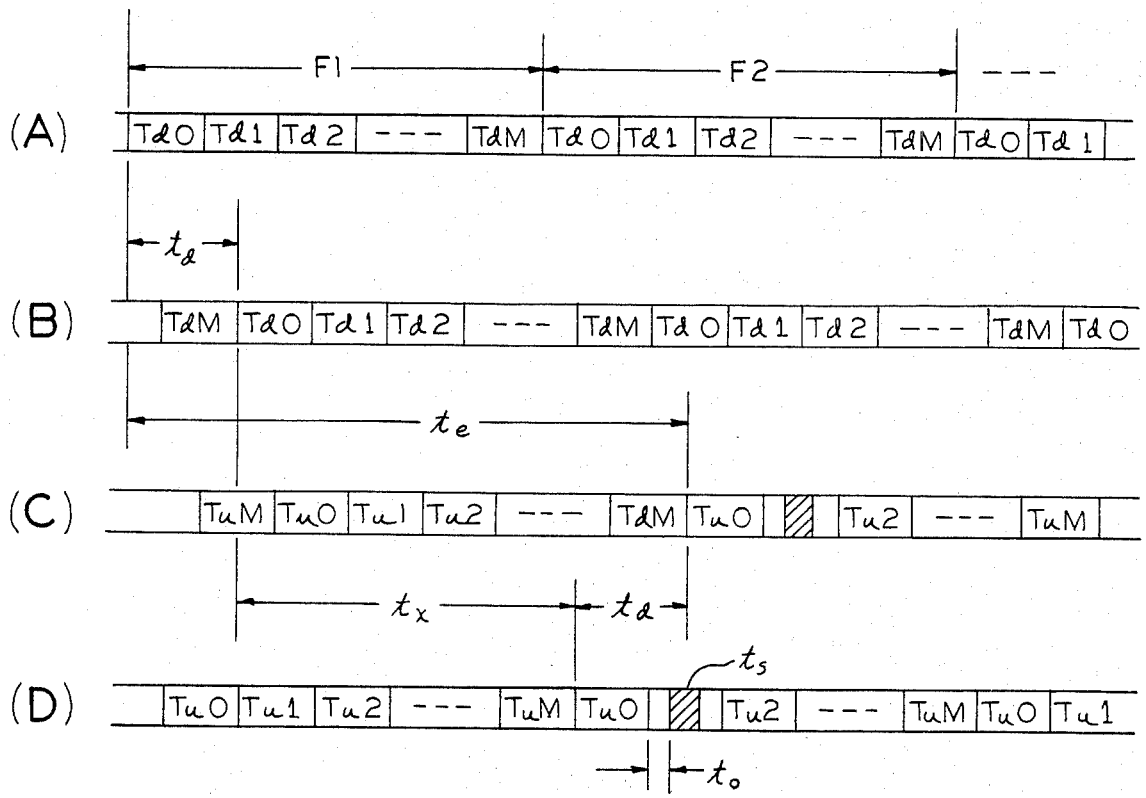
FIG. 2 is a schematic time chart for use in describing downward and upward frames sent and received at a central station of the network.
Figure 3:
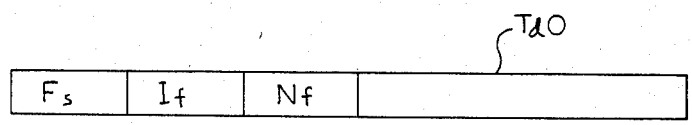
FIG. 3 schematically shows a control time slot included in the downward frame.

Referring to FIGS. 1 through 3, a multi-directional time division multiplex communication network will be described at first in order to facilitate an understanding of the present invention. The network (FIG. 1) is of a simple type and comprises a central station 11 having a certain service area and first through N-th satellite stations 12.1, 12.2, . . . , 12.N which are present in the service area. The network is for carrying out time division multiple access communication between the central station 11 and one to M stations of the satellite stations 12's (suffixes omitted). Communication between two or more of the satellite stations 12's is carried out through the central station 11.

A downward stream of transmission signals is sent from the central station 11 towards the satellite stations 12's. As illustrated at (A) in FIG. 2, the downward stream is divisible into frames F1, F2, . . . of a common frame period. Each downward frame comprises zeroth through M-th time slots Td0, Td1, Td2, . . . , Tdm (not shown), . . . , and TdM.

The zeroth time slot Td0 is a control time slot for use in sending various control signals as a part of the transmission signals as will become clear as the description proceeds. Let it, however, be mentioned here that the central station 11 sends a frame synchronization code Fs (FIG. 3) in the control time slot Td0 of each frame.

The first through the M-th time slots Td1 to TdM are speech time slots for use in sending burst signals as another part of the transmission signals. The burst signals are for carrying speech, data, and/or like communication signals. It should be understood that the word "speech" is used in naming the "speech time slot" as a representative of such communication signals. A downward communication channel is formed of the speech time slots given a certain ordinary number, such as the first time slots Td1's, in the successive frames of a certain duration of time.

In a numerical example, where the number N of the satellite stations 12's is 128, the number M of the speech time slots Td1 through TdM may be fifteen. The frame period may be about four milliseconds long and consist of 2,816 bits including a guard time (not shown) of 22 bits before each control time slot Td0. The control time slot Td0 may consist of 304 bits. The time slot length may be 166 bits long.

On communicating with a selected one of the satellite stations 12's, the central station 11 assigns one of the speech time slots Td1 through TdM to the selected station. As described heretobefore, the selected station may either be a call originating one of the satellite stations 12's or one of the satellite stations 12's that is called by the central station 11. The call origination is transmitted by a predetermined field (not shown) of the control time slot Td0 in the known manner. Merely for clarity of description, it will be assumed that the first time slot Td1 is an idle time slot before start of the communication and is assigned to the selected station. The central station 11 sends burst signals towards the satellite stations 12's in the first time slots Td1's of the respective frames of a certain number.

The downward stream reaches each satellite station 12 as depicted in FIG. 2 at (B) with a propagation delay $t_d$ that depends primarily on a distance between the central station 11 and the satellite station 12 in question.

Supplied with the transmission signals of the downward stream, each satellite station 12 regenerates a sequence of system clock pulses. With reference to the frame synchronization code Fs, the satellite station 12 receives the burst signals transmitted in the speech time slot assigned thereto. Furthermore, the satellite station 12 generates a time axis specific thereto. As will later be described more in detail, the time axis is generated with reference to the frame synchronization code Fs and in consideration of the propagation delay $t_d$ for that satellite station 12.

As will presently become clear, the time axis is for correctly timing burst signals which are to be sent from the selected station towards the central station 11 as a transmission signal. It may be that some others of the satellite stations 12's are also sending transmission signals to the central station 11. Such transmission signals must be received at the central station 11 as an upward stream of a format which is similar to that of the downward stream.

The frames described in conjunction with the downward stream, will now be called downward frames. As shown at (C) in FIG. 2, the upward stream is divisible into upward frames, each having the afore-mentioned frame period and comprising a plurality of speech time slots. It will be presumed that the number of speech time slots in each upward frame is equal to that in each downward frame. The speech time slots in the upward frame may now be referred to also as first through M-th time slots. The speech time slots will be designated by Tu1, Tu2, . . . , Tum (not shown), . . . , and TuM. The speech time slots Tu1 through TuM have the above-described time slot length and are arranged in each upward frame with a guard time (not shown) interposed between two adjacent time slots. Each upward frame furthermore comprises a control time slot Tu0.

The central station 11 assigns one of the speech time slots Tu1 through TuM to the selected station in the upward frame. The burst signals are sent from the selected station with reference to the time axis so as to arrive at the central station 11 in one of the speech time slots Tu1 to TuM that is assigned to the selected station.

For this purpose, the time axis specific to each satellite station 12 is divisible into local time slots as illustrated in FIG. 2 at (D). The local time slots are in one-to-one correspondence to the speech time slots Tu1 through TuM in each upward frame. For the local time slots which correspond to the respective speech time slots Tu1 to TuM, the time axis defines a response delay $t_x$ relative to the respective speech time slots Td1 to TdM received at each satellite station 12 (FIG. 2 (B)) if the guard time or times in the upward frame are neglected merely for brevity of description.

It will now be surmised that the speech time slot assigned to the selected station in the upward frame has the same ordinary number as the speech time slot assigned thereto in the downward frame. The network is designed so that the burst signal sent at one of the satellite stations 12's in immediate response to the burst signal sent at the central station 11 may reach the latter with a frame delay $t_e$ prescribed in consideration of operation in the most distant one of the satellite stations 12's and in, if any, the repeater station or stations connecting that satellite station with the central station 11. In any event, the response delay $t_x$ should be equal to the frame delay $t_e$ minus twice the propagation delay $t_d$. The satellite stations 12's are capable of adjusting their respective time axes so as to achieve the correct timing.

For the numerical example cited above, the control time slot Tu0 of the upward frame may consist of 64 bits and be preceded by a guard time (not shown) of 22 bits. When the time axes of the respective satellite stations 12's are correctly timed, each guard time between the speech time slots Tu1 through TuM is 16 bits long. The frame delay $t_e$ may be 4,480 bits long (about six milliseconds). Alternatively, the frame delay $t_e$ may be 7,296 bits long (about ten milliseconds).

Figure 4:
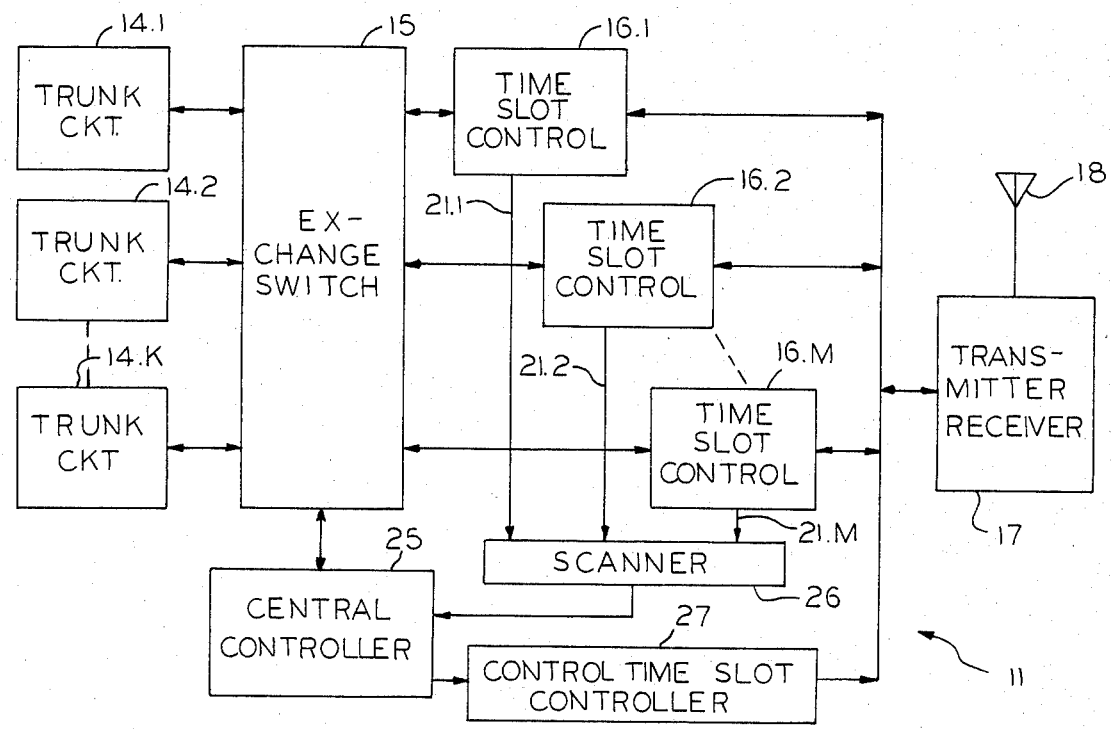
FIG. 4 is a block diagram of the central station which includes a part of a time axis adjusting system according to an embodiment of this invention.

Referring now to FIG. 4, the central station 11 is accompanied by a number of subscriber substations (not shown) connected thereto by metal lines. The central station 11 comprises first through k-th subscriber trunk circuits 14.1, 14.2, . . . , and 14.K known in the art of telephone networks. An exchange switch 15 is for selectively establishing connections between the trunk circuits 14's. Some of the trunk circuits 14's may be for outgoing and incoming calls. The exchange switch 15 is furthermore for selectively connecting the trunk circuits 14's with first through M-th time slot controllers 16.1, 16.2, . . . , and 16.M to convey communication signals between the trunk circuits 14's and the time slot controllers 16's. Connections between the satellite stations 12's are established also by the exchange switch 15.

It should be understood for the time being that the communication signals supplied for the exchange switch 15, are timed by the first through the M-th time slot controllers 16's and arranged in the first through the M-th time slots Td1 to TdM of each downward frame. The time slot controllers 16's are connected to a transmitter-receiver 17. Responsive to the communication signals supplied from the time slot controllers 16's, the transmitter-receiver 17 makes an antenna 18 send transmission signals of the downward stream towards the satellite stations 12's.

The upward stream of transmission signals reaches the antenna 18 and is converted to communication signals by the transmitter-receiver 17. When the speech time slot assigned to a selected station in the upward frame has the same ordinary number as the speech time slot assigned thereto in the downward frame as assumed before, it is possible to use only one of the time slot controllers 16's for the communication between the central station 11 and the selected station.

The time slot controllers 16's have busy lines 21.1, 21.2, . . . , and 21.M, respectively. While dealing with communication, each time slot controller 16 puts its busy line 21 in a busy state. Otherwise, the busy line 21 is made to look idle. The busy lines 21's are connected to a central controller 25 through a scanner 26 for cyclically scanning the busy lines 21's. The central controller 25 thereby monitors which of the speech time slots T1 through TM (the interposed letters d and u omitted) is or are idle time slots in each of the downward and the upward frames. The central controller 25 is furthermore for controlling the exchange switch 15 in the manner known in the art of telephone network.

It will now be assumed that a new satellite station is added to the network. A time axis specific thereto must be adjusted so as to attain the correct timing. The propagation delay $t_d$ to be used in defining the time axis, is very difficult to be correctly measured and can only roughly be estimated on a geographical map. At any rate, a preparatory time axis is generated as will later be described. Request for the time axis adjustment is sent by the new station to the central station 11 in the control time slot Tu0 of the preparatory time axis.

As will presently become clear, the central controller 25 counts the number of idle speech time slots in a downward frame and selects one thereof as an adjustment time slot only when the counted number is greater than a preselected number N', which may be three for the numerical example given above. The selected time slot may, for example, be the speech time slot which is first found idle among the idle time slots exceeding the preselected number N'. The central controller 25 supplies a control time slot controller 27 with a signal representative of the ordinary number given to the adjustment time slot. The control time slot controller 27 is for placing various codes in the control time slot Td0 of the downward frame as will shortly be described. The transmitter-receiver 17 sends thus formed control time slot Td0 to the satellite stations 12's through the antenna 18. The adjustment time slot may or may not later be used in transmitting that transmission signal towards the satellite stations 12's after completion of the time axis adjustment which carries the communication signal directed to the selected station.

Figure 5:
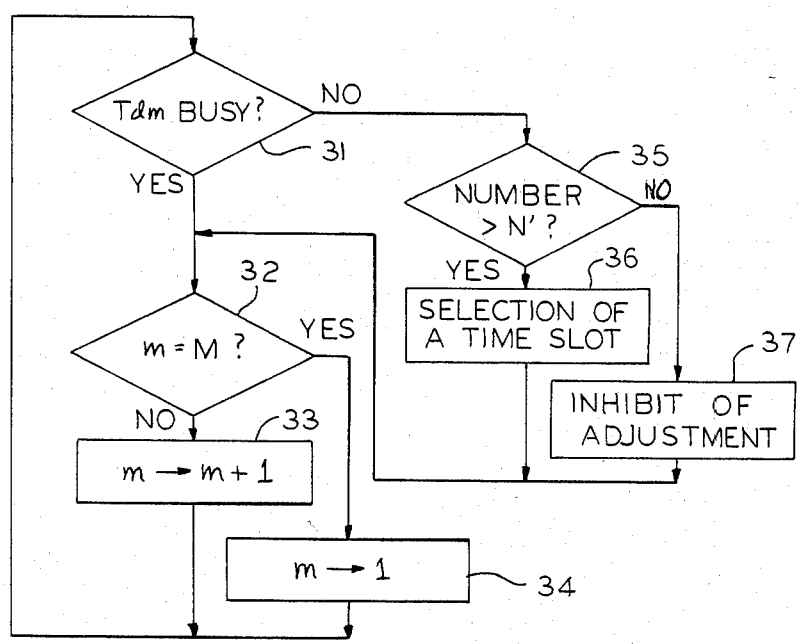
FIG. 5 is a flow chart for use in describing the operation which the time axis adjusting system carries out in the central station to find an idle speech time slot.

Referring additionally to FIG. 5, the central controller 25 may comprise a central processing unit for checking at a first stage 31 whether or not an m-th one of the speech time slots Td1 through TdM is busy. If the m-th time slot Tdm is busy, the central controller 27 checks at a second stage 32 whether or not the ordinary number m is equal to the number M of the speech time slots Td1 to TdM. If not, the central controller 25 adds one to the number m as indicated at a third stage 33. Otherwise, the ordinary number m is returned to the first as shown at a fourth stage 34. If the checked time slot is an idle time slot, the central controller 25 checks at a fifth stage 35 if the number of idle time slots is greater than the preselected number N' as counted from the first time slot Td1 in each downward frame.

If the counted number tends to exceed the preselected number N', the central controller 25 selects one of the idle time slots as an adjustment time slot and informs the control time slot controller 27 of the ordinary number of the adjustment time slot at a sixth stage 36. The control time slot controller 27 supplies an information field If (FIG. 3) and a number field Nf of the control time slot Td0 with an enable code indicative of the time axis adjustment and a number code representative of the number given to the adjustment time slot. The central controller 25 may preliminarily inform the feasibility of adjustment time slot selection to the control time slot controller 27 at the fifth stage 35.

If the counted number is equal to the preselected number N' or less, the central controller 25 informs the control time slot controller 27 of the fact at a seventh stage 37. The control time slot controller 27 turns the information field If to an inhibit code indicative of prohibition of the time axis adjustment.

For the numerical example of fifteen speech time slots given before, the enable and the inhibit codes may be 10101010 and 01010101 of the split phase code known in the art. The number code may be from 10101001 to 01010101 for the first through the fifteenth time slots T1 to T15. Preferably, the number code is changed to 10101010 when the inhibit code is placed in the information field If. It will now be possible for one skilled in the art to implement the control time slot controller 27 by using a random access memory for producing such codes in bit parallel and a parallel-to-series converter for converting the bit-parallel codes to bit-series codes and for delivering the bit-series codes to the transmitter-receiver 17. In practice, the control time slot controller 27 further comprises a central processing unit for analysing various information fed to the control time slot controller 27 from the central processor 25.

Figure 6:
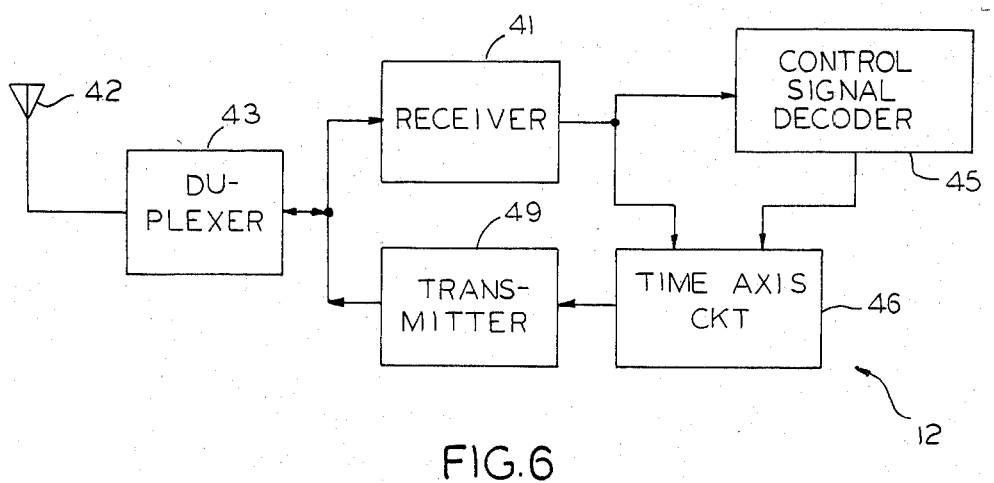
FIG. 6 is a block diagram of a satellite station which is included in the network and includes another part of the time axis adjusting system.

Turning to FIG. 6, each satellite station 12 comprises a receiver 41 for receiving the downward stream through an antenna 42 and a duplexer 43. The receiver 41 is for regenerating the system clock pulse sequence and for reproducing the signals received in, among others, the control time slot Td0 of the downward stream. Supplied with the regenerated clock pulse sequence and the reproduced control time slot Td0, a control signal decoder 45 detects the frame synchronization code Fs and then decodes the information and the number fields If and Nf. The control signal decoder 45 produces a leading edge signal indicative of a leading edge of the adjustment time slot received by the receiver 41.

A time axis circuit 46 is for generating the time axis in response to the clock pulse sequence supplied from the receiver 41 and the leading edge signal supplied from the control signal decoder 45. When a signal is delivered from the control signal docodor 45 in response to the enable code, the time axis circuit 46 is put in a mode of operation of adjusting the time axis. Insofar as a signal is fed from the control signal decoder 45 in response to the inhibit code, the time axis is left untouched.

In order to generate the time axis, the time axis circuit 46 may comprise a down counter in which an estimated delay $t_x'$ is set. The estimated delay $t_x'$ is equal to an estimation for the response delay $t_x$, namely, to the frame delay $t_e$ minus twice an estimation for the propagation delay $t_d$. Responsive to the leading edge signal, the down counter is counted down by the system clock pulses. The time axis circuit 46 may further comprise a read-only memory for producing a short acquisition signal of a predetermined pulse pattern when the down counter is counted down to zero.

At any rate, the time axis circuit 46 produces the short acquisition signal in one of the local time slots that corresponds in the upward frame to the speech time slot assigned to the illustrated satellite station 12 as the adjustment time slot. The short acquisition signal is fed to a transmitter 49, which makes the antenna 42 send a short burst signal $t_s$ (FIG. 2 (D)) to the central station 11 as a test electromagnetic wave.

As pointed out heretobefore, the estimation of propagation delay $t_d$ is considerably rough. Due to the rough estimation, the short burst signal $t_s$ may reach the central station 11 to give rise to interference to the adjacent time slots. When the adjustment time slot is the first time slot T1 (in each of the downward and the upward frames), the adjacent time slots are the control time slot Tu0 and the second time slot Tu2. The short acquisition signal is therefore produced by the time axis circuit 46 with a burst delay $T_0$ (FIG. 2 (D)) of a prescribed duration relative to the leading edge of the local time slot which corresponds to the adjustment time slot in the upward frame.

For the numerical example given hereinabove, the short burst signal $t_s$ may consist of 48 bits. The burst delay $t_0$ may be 59 bits long. This allows an estimation error of 12 km for the distance between the central station 11 and the satellite station under consideration.

It is now understood that the short burst signal $t_s$ is sent from the satellite station 12, after reception thereby of the frame synchronization code Fs, with a delay which is equal to a sum of the estimated delay $t_x'$ and the burst delay $t_0$. As will presently become clear, the estimated delay $t_x'$ is adjustable. The above-mentioned delay for the short burst signal $t_s$, is therefore an adjustable delay. Inasmuch as the estimated delay $t_x'$ is adjustable, the time axis preparatorily generated by the time axis circuit 46, may be called an adjustable time axis before completion of the time axis adjustment. Furthermore, it is possible to refer to the local time slots as adjustable time slots and to set the adjustable delay in the afore-mentioned down counder rather than the estimated delay $t_x'$.

Referring back to FIG. 4, the short burst signal $t_s$ is received by the transmitter-receiver 17. A reproduction of the short acquisition signal is delivered to that one of the time slot controllers 16's which deals with the speech time slot used as the adjustment time slot. As will shortly be described, the time slot controllers 16's for use in this invention are accompanied by error measuring circuits, respectively. The error measuring circuit of the time slot controller 16 in question, measures an error which the reproduced acquisition signal may have. The error, if any, is produced as an error signal, which is fed back to the transmitter-receiver 17 and thence sent towards the satellite stations 12's as a part of the transmission signals in the adjustment time slot of the downward frame.

Figure 7:
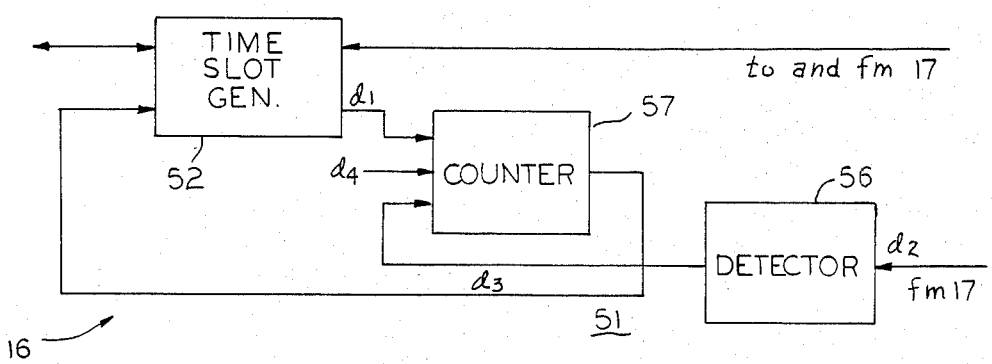
FIG. 7 is a block diagram of a part of a time slot controller for use in the central station.
Figure 8:
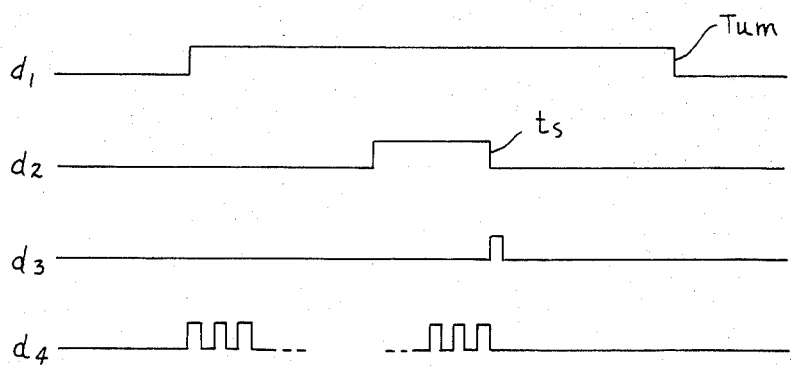
FIG. 8 is a schematic time chart for use in describing operation of an error measuring circuit included in the time slot controller.

Turning to FIGS. 7 and 8, the error measuring circuit is depicted at 51 and coupled to a conventional time slot generator 52 of the time slot controller 16. For convenience of description, the time slot controller 16 will be assumed to deal with the m-th time slot Tm in each of the downward and the upward frames. The time slot generator 52 produces an upward time slot pulse $d_1$ (also in FIG. 8) for timing the m-th time slot Tum in each upward frame. The reproduced acquisition signal is shown at $d_2$. The error measuring circuit 51 comprises a detector 56 which produces a detection pulse $d_3$ when supplied with the reproduced acquisition signal $d_2$ from the transmitter-receiver 17. A counter 57 is triggered by the leading edge of the upward time slot pulse $d_1$ to count the system clock pulses depicted at $d_4$. Responsive to the detection pulse $d_3$, the counter 57 produces the error signal with reference to a sum of the response delay $t_x$ and the duration of the acquisition signal $d_2$. The error signal is fed to the time slot generator 52 and thence delivered to the transmitter-receiver 17 in the m-th downward time slot Tdm.

It is now understood that the error measuring circuit 51 compares the adjustable delay with the preselected frame delay $t_e$ to produce the error signal. The error signal is indicative of a difference between the adjustable time axis and the time axis specific to the satellite station 12 under consideration. In cooperation with the time slot generator 52, the transmitter-receiver 17 sends the error signal in the adjustment time slot which next follows the downward frame wherein the number code is sent to specify the adjustment time slot.

Turning back to FIG. 6, the error signal is reproduced like usual communication signals. It is possible to make the error signal merely indicate one of advance, correct timing, and delay of the adjustable time slot. In this event, one of three small indicator lamps (not shown) may be lit by the reproduced error signal. An operator can manually adjust the estimated delay $t_x'$ in the afore-described down counter. Alternatively, it is possible to make the error signal represent the error in terms of the system clock pulses. In this latter event, it is possible to automatically adjust the estimated delay $t_x'$.

Figure 9:
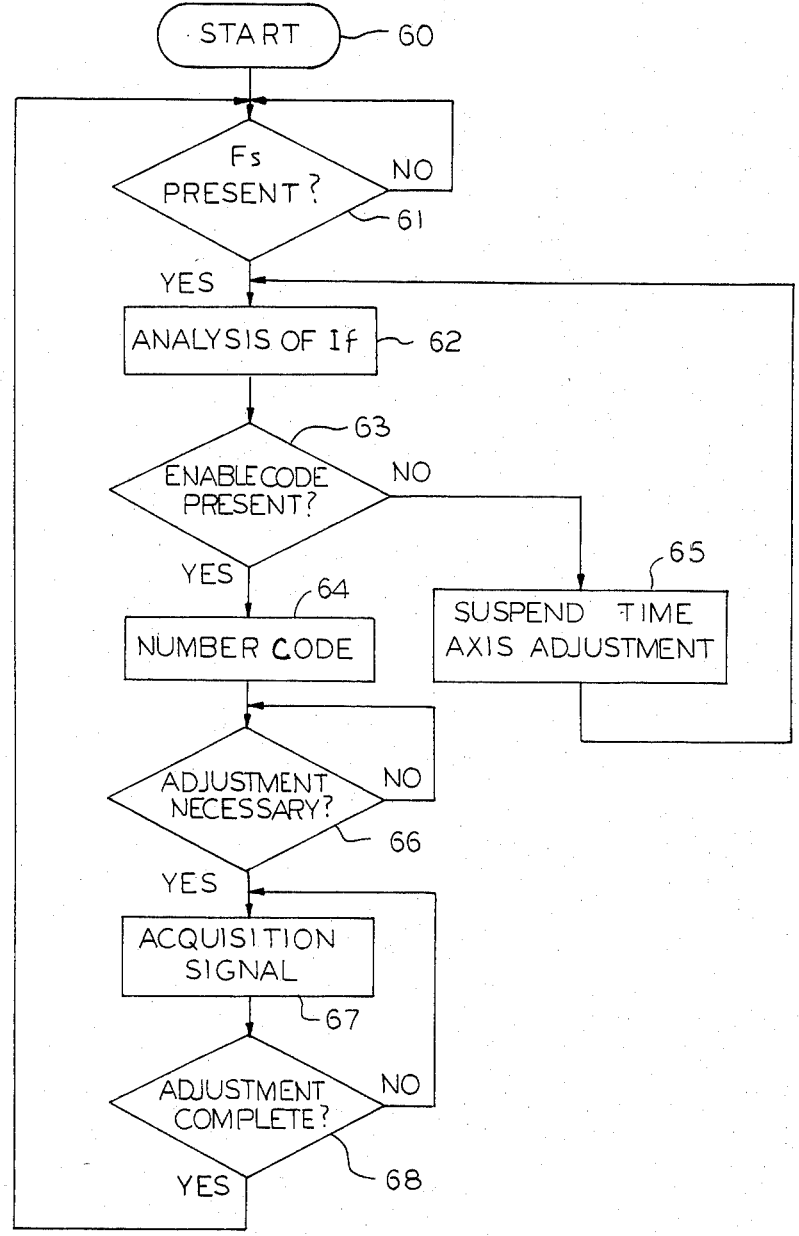
FIG. 9 is a flow chart for use in describing time axis adjusting operation carried out in the satellite station.

Finally referring to FIG. 9, it is possible to implement the control signal detector 45 and the time axis circuit 46 of each satellite station 12 by a circuit unit, such as a microprocessor, which is programmed to be operable as follows. At first, the circuit unit is put into operation at a zeroth stage 60. A frame synchronization code Fs is searched for at a first stage 61. When a frame synchronization code Fs is found, the circuit unit analyses at a second stage 62 the information field If of the control time slot Td0 in which the frame synchronization code Fs has been found at the first stage 61. If the analysis shows that an enable code is present in the information field If as indicated at a third stage 63, the ordinary number of the adjustment time slot is produced at a fourth stage 64 to indicate the time axis adjustment. If an inhibition code is present, the time axis adjustment is suspended at a fifth stage 65. Furthermore, a frame synchronization code Fs is again searched for, with the circuit unit put in a state of analysing the information field If.

At a sixth stage 66, necessity of the time axis adjustment is checked with reference to the error signal sent through the adjustment time slot of the downward frame in which the frame synchronization code Fs was found at the first stage 61. If unnecessary, the circuit unit is put in a state for again checking the necessity. Furthermore, a frame synchronization code Fs is again searched for. If necessary, the circuit unit is put in a state of detecting the error signal. Depending on the result of decoding, an acquisition signal is produced at a seventh stage 67. The transmitter 49 (FIG. 6) makes the antenna 42 send the short burst signal $t_s$ (FIG. 2 (D)). At an eighth stage 48, completion of the time axis adjustment is checked. Before completion of the adjustment, the circuit unit is returned to a state of producing the acquisition signal. The frame synchronization code Fs is again searched for. Responsive to an enable code that is next detected, the adjustment is carried out in compliance with a new error signal. Upon completion of the adjustment, the circuit unit returns to the state of searching for the frame synchronization code Fs in another downward frame.

It is now appreciated that the above-described time axis adjustment is equally well feasible when a call originates at one of the satellite stations 12's or at the central station 11 in response to an original call originating either at another of the satellite stations 12's or one of the subscriber substations that is connected to one of the trunk circuits 14's in the manner known in the telephone network art. Alternatively, the original call may result from an incoming call. Communication is given a higher priority than the time axis adjustment because at least one speech time slot is always kept idle even when the time axis adjustment is in progress. When there is idle speech time slots in excess of the preselected number N' in each of the downward and the upward frames, the time axis adjustment is likewise feasible cyclically or otherwise for those of the satellite stations 12's, in which the communication is not in progress.

While this invention has thus far been illustrated with reference to the accompanying drawing and in conjunction with a set of numerical examples, it will now be readily possible for one skilled in the art to carry this invention into effect in various other manners. It may be mentioned in this connection that two or more of the idle speech time slots may concurrently be used in each of the downward and the upward frames for the time axis adjustment provided that there is at least one idle speech time slot kept for a call which might originate in the meanwhile. The propagation delay $t_d$ is preferably kept constant at each repeater station when the radio communication network comprises a plurality of repeater stations besides the substations.

What is claimed is:

1. A time axis adjusting system for use in a radio communication network in which time division multiple access communication is carried out between a central station and a plurality of satellite stations by the use of signals sent in first frames and received in second frames at said central station, each of said first and said second frames comprising a predetermined number of consecutive speech time slots each having a common time slot length, said consecutive time slots being identified by consecutive number codes, each first frame further comprising a control time slot including a frame synchronization code as a part of said signals, said satellite stations comprising time axis generating means for generating time axes specific thereto, said generated time axis being for defining local time slots in which signals are sent to be received at said central station in said second frames from those of said satellite stations which are carrying out the time division multiple access communication, wherein said central station comprises:

first central station means for checking whether or not more than a preselected number of the speech time slots are idle time slots in each of said first and said second frames and for assigning one of said idle time slots in one each of said first and said second frames to one of said satellite stations as an adjustment time slot for use in adjusting the time axis specific to said one of the satellite stations; and second central station means coupled to said first central station means for transmitting a number code in said control time slot, said number code being representative of the number given to said adjustment time slot.

2. A time axis adjusting system as claimed in claim 1, said central station receiving each second frame with a prescribed frame delay after sending each first frame, wherein:

each satellite station comprises first satellite station means for receiving said frame synchronization code and said number code;

the time axis generating means of said each satellite station comprising:

second satellite station means coupled to said first satellite station means for generating an adjustable time axis with an adjustable delay relative to the frame synchronization code received by said first satellite station means, said adjustable time axis defining adjustable time slots corresponding to the speech time slots of the second frame; and third satellite station means coupled to said second satellite station means for sending a burst in one of said adjustable time slots that is specified by the number code received by said first satellite station means, said burst appearing with a prescribed burst delay relative to a leading edge of said one of the adjustable time slots to represent said adjustable delay and having a duration which is shorter than said common time slot length.

3. A time axis adjusting system as claimed in claim 2, wherein said central station further comprises:

third central station means for receiving said burst;

fourth central station means for comparing said adjustable delay with said prescribed frame delay to produce an error signal indicative of a difference between the adjustable time axis and the time axis specific to said one of the satellite stations; and fifth central station means for sending said error signal in the adjustment time slot of the first frame next following the first frame in which said number code is sent.

4. A time axis adjusting system as claimed in claim 3, wherein the time axis generating means of each satellite station further comprises:

fourth satellite station means for receiving said error signal; and fifth satellite station means coupled to said second and said fourth satellite station means for adjusting said adjustable time axis with reference to the error signal received by said fourth satellite station means.

* * * * *